US010990866B1

(12) United States Patent
 Gupta

(10) Patent No.: US 10,990,866 B1
(45) Date of Patent: Apr. 27, 2021

(54) RANDOM GRAPHICAL AUTHENTICATION

(71) Applicant: Bank of America Corporation, Charlotte, NC (US)

(72) Inventor: Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/892,391

(22) Filed: Jun. 4, 2020

(51) Int. Cl.
 *G06K 19/06* (2006.01)
 *G06Q 20/20* (2012.01)

(52) U.S. Cl.
 CPC .. *G06K 19/06112* (2013.01); *G06K 19/06037* (2013.01); *G06Q 20/204* (2013.01)

(58) Field of Classification Search
 CPC ...... G06Q 20/40; G06Q 20/10; G06Q 20/204; G07F 7/1008; G07F 7/08; G07F 7/10; G07F 7/025; G07F 7/12; G07F 7/0866; G06K 7/1417; G06K 19/06037; G06K 7/0008; G06K 19/06112; G06F 21/31; G06F 21/34
 USPC ............... 235/375, 379, 380, 382, 487, 492; 705/16, 35, 39, 41, 44, 65
 See application file for complete search history.

(56) References Cited

U.S. PATENT DOCUMENTS

| 6,808,118 B2 * | 10/2004 | Field ................ G06K 19/06009 235/375 |
| 7,896,238 B2 * | 3/2011 | Fein .................... G06Q 20/342 235/380 |
| 2006/0113381 A1 | 6/2006 | Hochstein et al. |
| 2019/0286805 A1 | 9/2019 | Law et al. |

FOREIGN PATENT DOCUMENTS

| GB | 2564655 | 1/2019 |
| WO | WO2016/160816 | 10/2016 |

* cited by examiner

*Primary Examiner* — Jamara A Franklin
(74) *Attorney, Agent, or Firm* — Weiss & Arons LLP; Michael A. Springs, Esq.

(57) ABSTRACT

A method for card authentication is provided. Methods may include receiving a card with a graphical representation and a plurality of transaction details at a card reader. Methods may include processing the graphical representation. The processing may identify a representative number. Methods may include deciphering card data from the representative number. Methods may include transmitting the card data and the transaction details for approval and/or denial. Methods may include receiving an approval and/or denial. Methods may include generating an updated graphical representation. Methods may include pushing the updated graphical representation to the card.

17 Claims, 5 Drawing Sheets

RANDOM GRAPHICAL AUTHENTICATION

BACKGROUND OF THE DISCLOSURE

In recent years, fraudulent card production has become more prevalent. The fraudulent cards are produced using stolen card authentication data. This process of producing fraudulent cards using stolen card authentication data is known as card cloning.

In order to create cloned cards, fraudsters steal card authentication data. The card authentication data may be stolen using a variety of methods.

One method for stealing card authentication data includes the use of skimming devices. Skimming devices are small devices that are planted within a legitimate card reader. The skimming device reads the card authentication data off the card's magnetic strip as the card is being used for a legitimate transaction. The skimming device stores the card authentication data and/or transmits the card authentication data to a storage location. The stolen card authentication data is then used to create cloned cards.

It would be desirable to create a card that includes security and intelligence directed to neutralizing a threat posed by a skimming device.

It would be further desirable for the card to be absent any static identification data.

It would be further desirable for the card to include a graphical representation of dynamic identification data.

SUMMARY OF THE DISCLOSURE

A method for card authentication is provided. The method may include receiving a card and transaction details at a card reader.

The received card may include a display. The display may be a dynamic display. The dynamic display may be variable. As such, the dynamic display may change. The change may occur a predetermined period of time after a transaction, upon the completion of a transaction, periodically or at any other suitable time.

The dynamic display may be constructed using electronic ink. Electronic ink is an electronic display technology that utilizes charged or uncharged microcapsules to create an image. Different charges can be applied to the microcapsules in order to create an image. The image can be changed at any time. The image can be changed by applying different charges to the microcapsules. As such, the image can be changed at any point in time.

The dynamic display may be constructed using organic light emitting diode ("OLED") technology. OLED displays are light emitting diode ("LED") displays in which the emissive electroluminescent layer is film of organic compound that emits light. The emission of light may be in response to an electric current. The organic layer may be situated between two electrodes. OLED displays are used to create flexible and transparent displays. OLED displays are also dynamic displays. As such, the image displayed on an OLED display can be changed at any point in time.

The dynamic display may display a graphical representation. The graphical representation may be in the shape of a pie graph, line graph, square, triangle or any other suitable shape.

The received transaction details may include details relating to a transaction. Exemplary transaction details include one or more items, a transaction dollar amount, a merchant and a timestamp.

The graphical representation, such as the pie graph, may be processed at a graphical representation processing module. In some embodiments, the graphical representation processing module may be located within the card reader.

In certain embodiments, the graphical representation processing module may be located at a web service. In these embodiments, the graphical representation may be transmitted to the web service via a URL hosted module. The web service may process the graphical representation and transmit the processed graphical representation to the card reader.

The graphical representation processing module may identify a plurality of colors included in the graphical representation. The graphical representation processing module may determine a representative number from the plurality of colors.

The determination may be based on a dynamic color-to-numeral mapping. Each color included in the color-to-numeral mapping may represent a numeral. In some embodiments, each color may represent a unique numeral. For example, red may represent 0, orange may represent 1, yellow may represent 2, green may represent 3, blue may represent 4, violet may represent 5, pink may represent 6, white may represent 7, black may represent 8 and grey may represent 9. In certain embodiments, a color may represent one or more numerals and/or two or more colors may represent one numeral.

The color-to-numeral mapping may be dynamic. As such, within a first time window, red may represent 0 and within a second time window, red may represent 6.

The method may include transmitting the representative number and the plurality of transaction details to a decryption controller module within the card reader.

The decryption controller module may identify a random number control digit within the representative number. The random number control digit may be located in a predetermined location within the representative number. The predetermined location may, for example, be the last digit in the representative number. In addition to providing the random number sequence for the padding, the random number control digit may also indicate a sequence for padding the representative number. Also, there may be a predetermined schedule of digits and random number sequences.

For example, the random number control digit may be 8. The control digit 8 may indicate, based on the predetermined schedule, the following random number sequence: 0208129. The random number sequence may be deciphered in the following manner:

| ⌊02⌋ | ⌊08⌋ | ⌊12⌋ | ⌊9⌋ |
|---|---|---|---|
| ⌊random no.position⌋ | ⌊random no.position⌋ | ⌊random no.position⌋ | ⌊random number⌋ |

The last digit (9) may be the random number. The number 9 may be inserted into the 02 position of the representative number (the second position in the representative number). The number 9 may also be inserted in the 08 position of the representative number (the eighth position in the representative number). The number 9 may also be inserted in the 12 position of the representative number (the twelfth position in the representative number).

The decryption controller module may remove the random numbers from the representative number.

The decryption controller module may also identify an information order control digit within the representative number. The information order control digit may be located in a predetermined location within the representative number. The predetermined location may be the second to last digit in the representative number. The information order control digit may indicate a sequence of the card data included in the representative number. The representative number may include the following exemplary card data: 1. user identification number, 2. five digits of last transaction amount, 3. five digits of the second to last transaction amount, 4. last transaction device identifier and 5. second to last transaction device identifier. The information order control digit may indicate the order in which the card data is presented within the representative number. For example, the information order control digit may be 9. The control digit 9 may indicate the following information order sequence: 54321. As such, the exemplary card data may be presented within the representative number in the following order: 5. second to last transaction device identifier, 4. last transaction device identifier, 3. five digits of second to last transaction amount, 2. Five digits of last transaction amount and 1. user identification number. As such, the decryption controller may decipher the card data.

The method may include transmitting, from a verification controller module, the card data and the plurality of transaction details to a card issuer. The method may include receiving a response from the card issuer. The method may include displaying the received response at the card reader.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
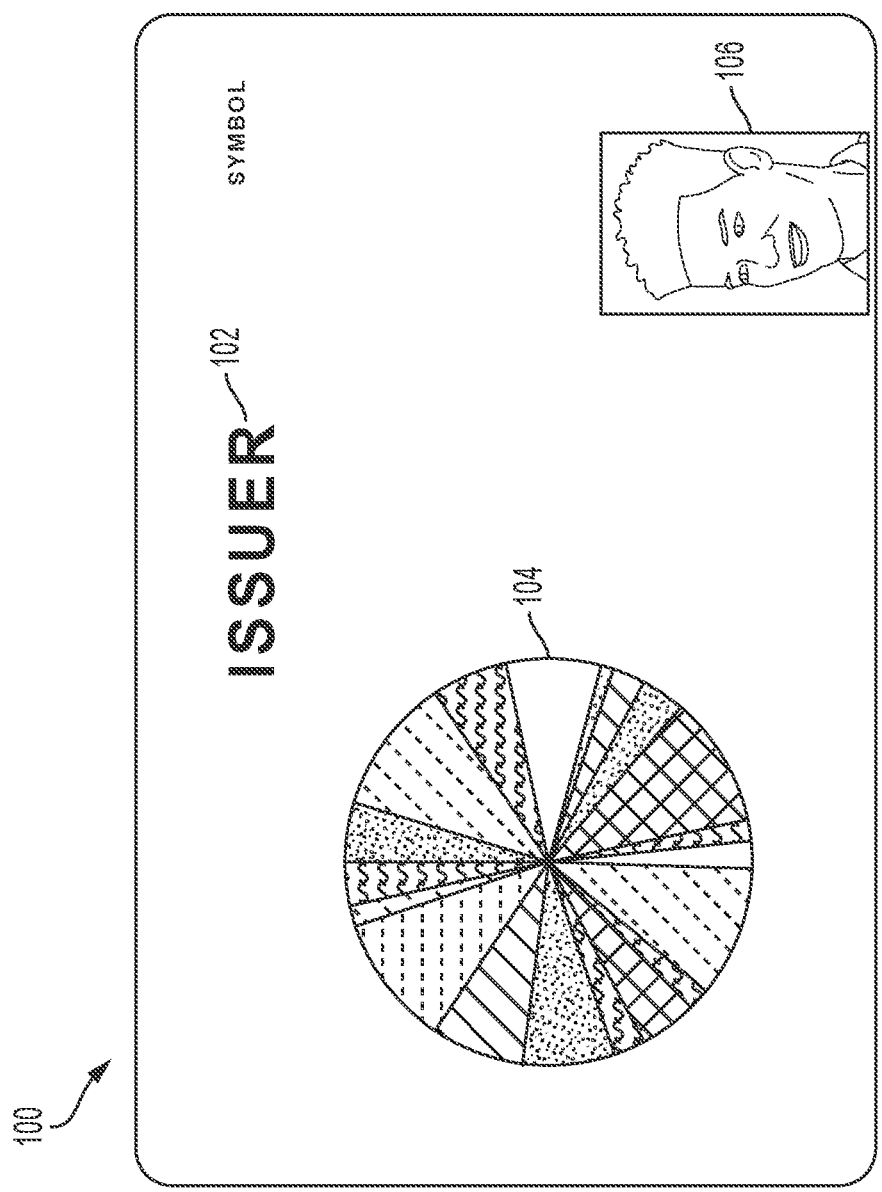
FIG. 1 shows an illustrative diagram in accordance with principles of the disclosure.

Apparatus and methods for random graphical card authentication are provided.

Apparatus may involve an automated teller machine ("ATM"). The ATM may include a card reader. The card reader may be operable to receive insertion of a card. The card may include a graphical representation.

The ATM may include a graphics controller. The graphics controller may select a random color for each numeral included in a plurality of numeral. The selection may identify a color-to-numeral interpretation.

In some embodiments, the graphics controller may receive the graphical representation from the card. In other embodiments, a decryption controller, also included in the ATM, may receive the graphical representation from the card. The graphics controller and/or the decryption controller may translate the graphical representation, received from the card, into numerical data. The numerical data may include a representative number.

In the event that the graphics controller translates the graphical representation into numerical data, the graphics controller may transmit the numerical data to the decryption controller.

The ATM may also include a front controller. The front controller may receive the numerical data from the graphics controller. The front controller may also generate refreshed transaction data upon completion of a transaction. Refreshed transaction data may include a merchant device identifier, an amount and other suitable transaction data. The front controller may also generate an updated information order control digit. The front controller may also generate an updated random number control digit. The front controller may also maintain the color-to-numeral control digit in its current state.

The ATM may also include a decryption controller. The decryption controller may receive the graphical representation from the graphics controller. The decryption controller may receive the color-to-numeral interpretation from the front controller. The decryption controller may identify the numerical data based on the graphical representation and the color-to-numeral interpretation.

The decryption controller may identify a random number control digit within the numerical data. The decryption controller may identify the information order control digit within the numerical data. The decryption controller may remove one or more random numbers from the numerical data. The one or more random numbers may be located in locations within the numerical data. The locations may be controlled by the random number control digit.

The decryption controller may decipher card data from the numerical data. The card data may include a user identification number, a last transaction amount, a second to last transaction amount, a last transaction device identifier and a second to last transaction identifier. The decryption controller may transmit the card data and a set of transaction data.

The ATM may include a verification controller. The verification controller may receive the card data and the set of transaction data. The verification controller may transmit the card data and the set of transaction data to an issuer. The verification controller may receive an approval and/or denial response from the issuer. The verification controller may transmit the response to a display module within the ATM. The ATM may display the response.

Upon the completion of the transaction, and/or during the processing of the transaction, an updated representative number may be pushed to card. The following components be used to update to generate an updated graphical representation of the updated representative number.

The ATM may also include a random number generator. The random number generator may periodically generate a random number. The random number may be used by the front controller to generate the updated random number control digit. The random number generator may also transmit the generated random number to the front controller. The random number generator may also generate one or more random numbers to be placed in locations within the numerical data. The locations may be controlled by the random number control digit.

The ATM may also include a computation node. The computation node may be operable to receive, from the front controller, the refreshed transaction data, updated information order control digit and the updated random number control digit. The computation node may also determine an updated numerical data based on the refreshed transaction data, the updated information order control digit, the updated random number control digit and the numerical data. The computation node may also transmit the updated numerical data to the graphics controller.

The graphics controller may receive updated numerical data. The graphics controller may translate the update numerical data into an updated graphical representation. The graphics controller may also push the updated graphical representation to the card.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows illustrative card 100. Card 100 may include an issuer name and/or symbol, such as the issuer name and/or symbol shown at 102.

Card 100 may also include photo 106. Photo 106 may identify the bearer of card 100.

Card 100 may also include graphical representation 104. Graphical representation 104 may represent numerical data. When graphical representation 104 is interpreted using a color-to-numeral mapping, a representative number may be identified.

The representative number may incorporate various data elements. Exemplary data elements may include a user identifier, the two most recent transaction amounts and the two most recent transaction device identifiers.

The representative number may be padded with one or more random numbers. A random number control digit, included in the representative number, may identify the placement of the random numbers within the representative number.

The order of the data elements within the representative number may be a dynamic order. An information order control digit, included in the representative number, may identify the current order of the data elements.

In order for the graphical representation to be dynamic—i.e., changeable—card 100 may be equipped with an ultra slim nano display. The ultra slim nano display may include an electronic ink portion. The electronic ink portion may facilitate fluctuations within the display.

Figure 2:
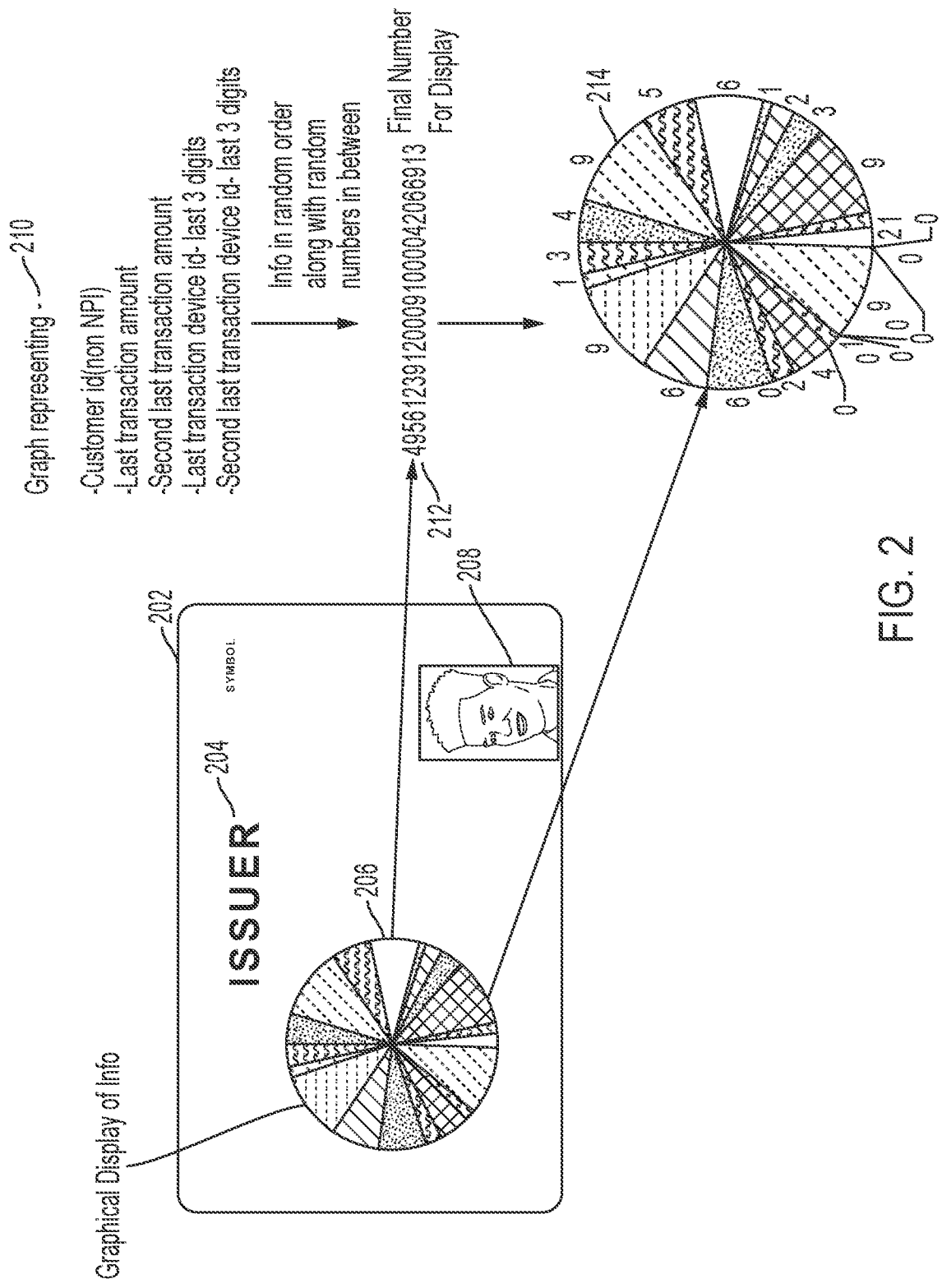
FIG. 2 shows another illustrative diagram in accordance with principles of the disclosure.

FIG. 2 shows an illustrative diagram. The illustrative diagram includes card 202. Card 202 may include graphical representation 206, issuer identification 204 and photo 208.

Graphical representation 206 may represent numerical data, such as a representative number. Graphical representation 206 may represent data elements, as shown at 210. The data elements may include a customer identifier, a last transaction amount, a second to last transaction amount, a last transaction device identifier and a second to last transaction device identifier. A transaction amount may include five digits or any other suitable number of digits. In some instances, the transaction amount may be truncated to fit into a predetermined number of digits. A transaction device identifier may include three digits or any other suitable number of digits. In some instances, the transaction device identifier may be truncated to fit into a predetermined number of digits.

The data elements may be positioned in a random order. Random numbers may be placed in between the data elements. The final representative number may be shown at 212. The final representative number may be translated into a graphical representation, as shown at 214.

Figure 3:
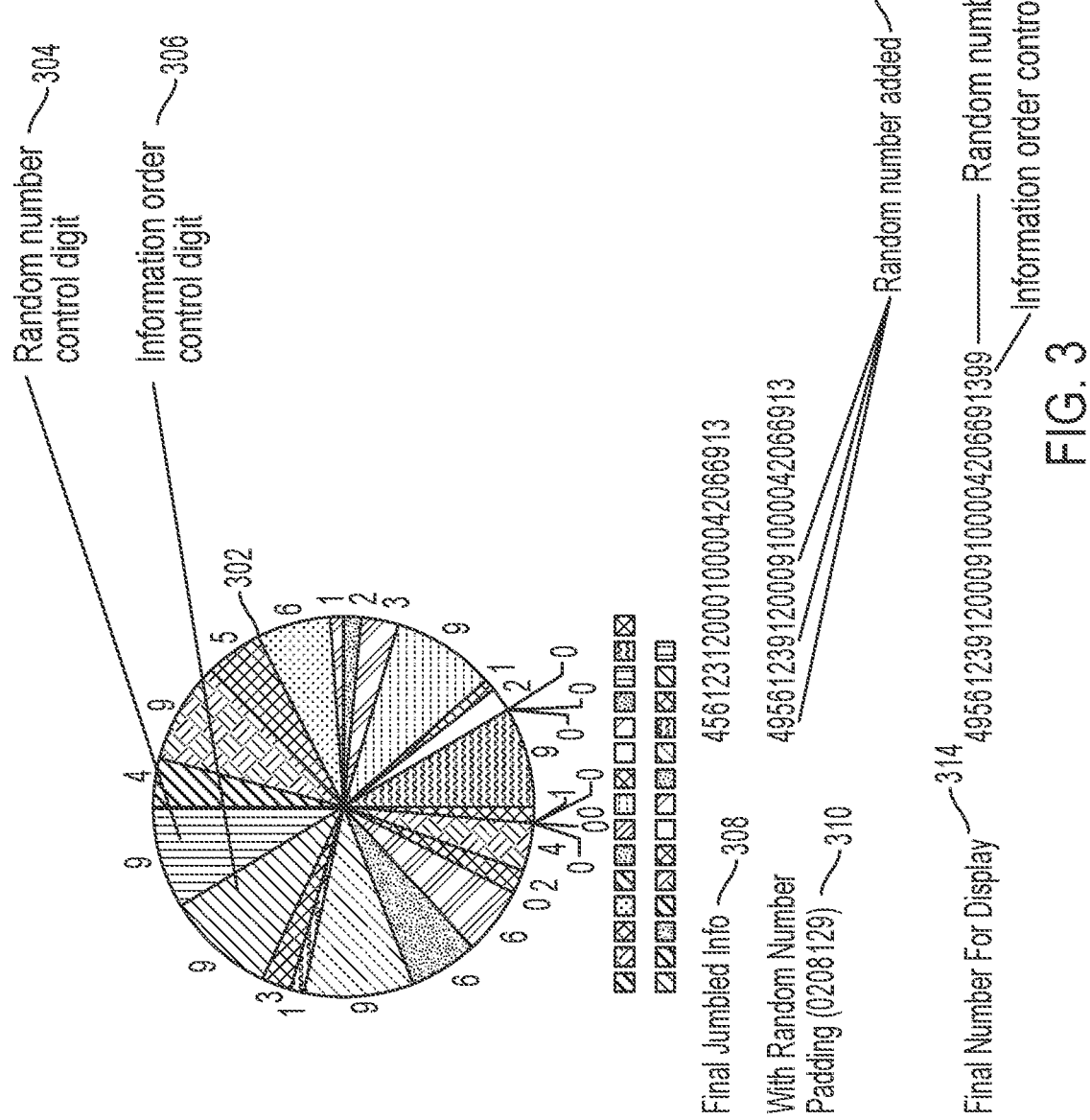
FIG. 3 shows yet another illustrative diagram in accordance with principles of the disclosure.

FIG. 3 shows an illustrative diagram. Graphical representation 302 may include a plurality of digits. One digit may be a random number control digit, as shown at 304. One digit may be a information order control digit, as shown at 306.

Each of the patterns shown in graphical representation 302 may correspond to a different numerical digit. The jumbled number shown at 308 may include the data elements in a random order. The number shown at 310 may also include random digits positioned within various locations in the jumbled number. The number shown at 314 may also include the random number control digit and the information order control digit.

Figure 4:
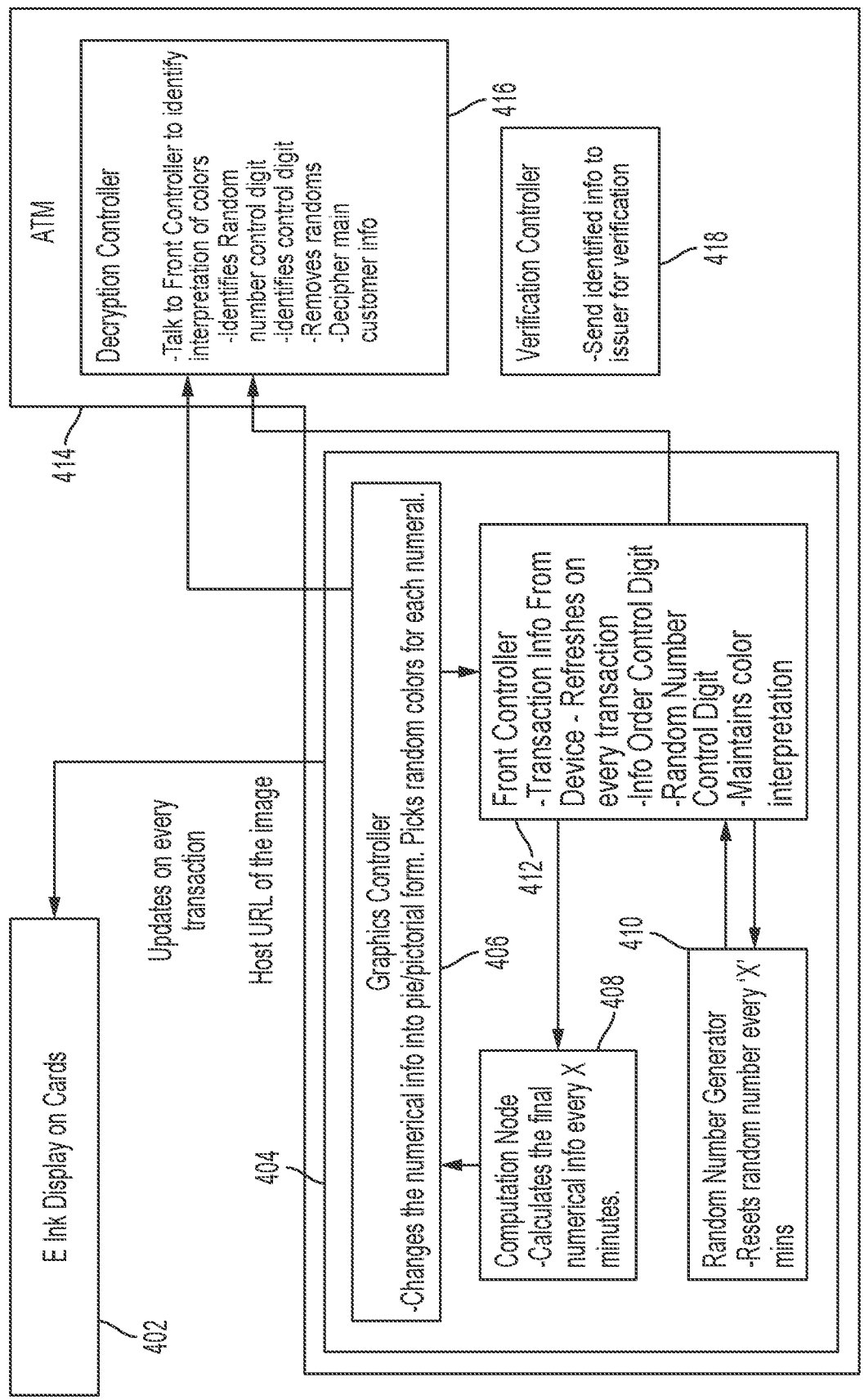
FIG. 4 shows an illustrative flow diagram in accordance with principles of the disclosure.

FIG. 4 shows an illustrative flow diagram. Automated teller machine ("ATM") 414 may include three segments: Segment 404 that pushes information to the card, decryption controller 416 and verification controller 418.

Segment 404 may include graphics controller 406, front controller 412, computation node 408 and random number generator 410.

The flow diagram may also show a card. The card may include an electronic ink display, as shown at 402. The electronic ink display may include a graphical representation.

Card with electronic ink display, shown at 402 may be inserted into ATM 414. ATM 414 may also receive transaction data, such as a transaction amount.

Decryption controller 416 may receive the graphical representation. Decryption controller 416 may receive the color-to-numeral interpretation from front controller 412. Decryption controller 416 may utilize the color-to-numeral interpretation to determine a representative number represented by the graphical representation. Decryption controller 416 may identify the random number control digit and the information order control digit. Decryption controller 416 may remove the random numbers. Decryption controller 416 may utilize the information order control digit to decipher data elements, such as user identification data.

Verification controller 418 may transmit the deciphered data elements along with transaction data to an issuer for verification. Verification controller 418 may receive approval and/or denial of the transaction data. The approval and/or denial of the transaction data may be displayed to the user using a display associated with ATM 414.

In addition, ATM 414 may update the graphical representation on card 402 at every transaction. As such, front controller 412 may determine the transaction data to be included in the graphical representation. Front controller 412 may also determine an information order control digit and a random number control digit. Front controller 412 may also maintain the color-to-numeral interpretation.

Random number generator 410 may reset a random number periodically. Random number generator 410 may transmit the generated random number to front controller 412.

Computation node 408 may calculate the final numerical data periodically, after a transaction or upon any other suitable time period.

Computation node 408 may transmit the final numerical data to graphics controller 406. Graphics controller 406 may change the numerical data into a graphical representation, also referred to as a pictorial/pie form. Graphics controller 406 may also select random colors for each numeral. Graphics controller 406 may transmit the selected color-to-numeral interpretation to front controller 412.

Figure 5:
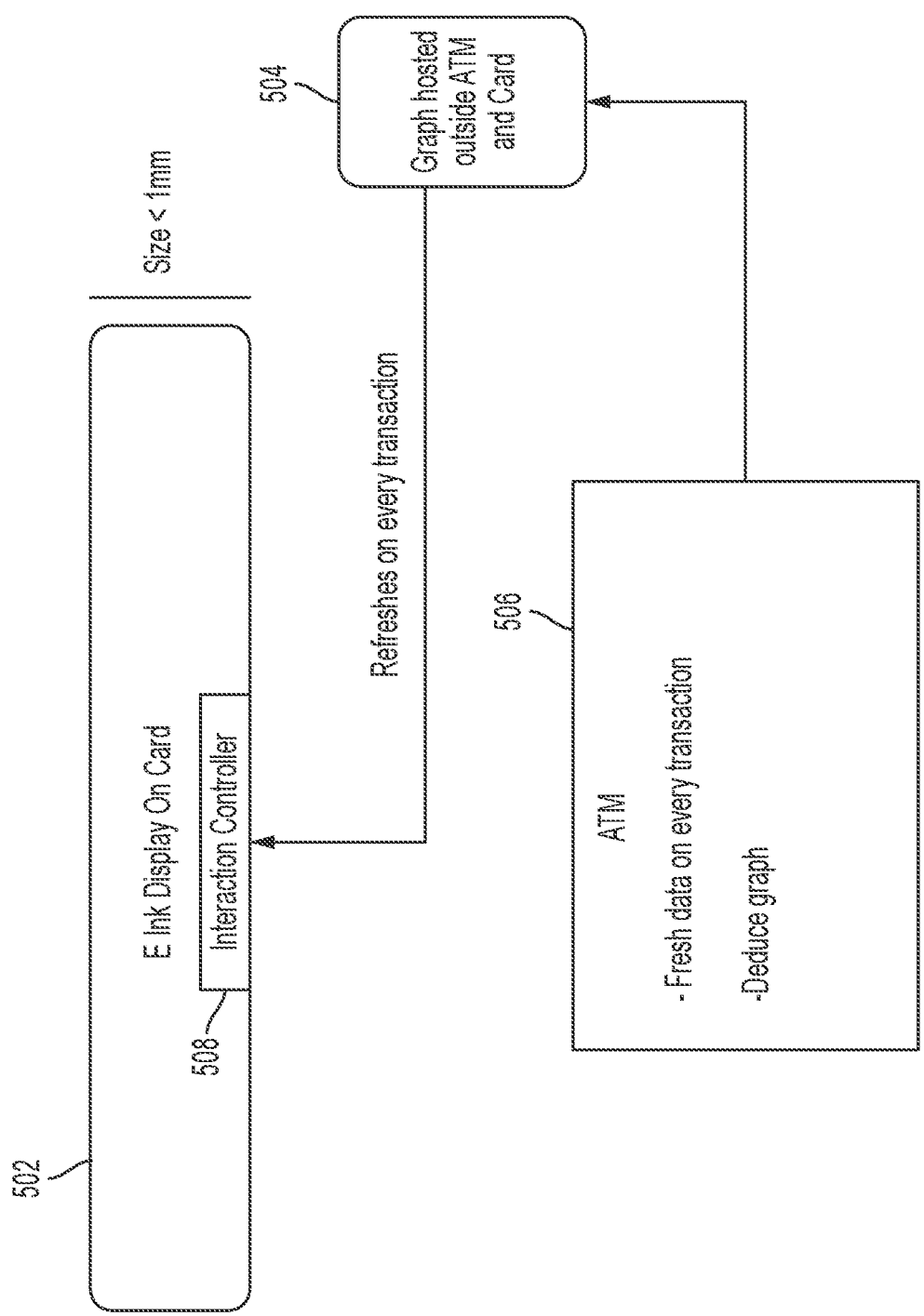
FIG. 5 shows another illustrative flow diagram in accordance with principles of the disclosure.

FIG. 5 shows an illustrative flow diagram. Card with electronic ink display, shown at 502 may be less than 1 millimeter in height. Card 502 may also include interaction controller 508. Interaction controller 508 may communicate with graph 504. Graph 504 may transmit graphical data to card 502 via interaction controller 508.

Graph 504 may be hosted outside ATM 506 and card 502. Graph 504 may be hosted on a web service. As such, ATM 506 may not include a graphical processing module.

ATM 506 may determine fresh data at every transaction. ATM 506 may also deduce or decipher the graph received.

Thus, a system for random graphical authentication is provided. Persons skilled in the art will appreciate that the present invention can be practiced by other than the described embodiments, which are presented for purposes of illustration rather than of limitation. The present invention is limited only by the claims that follow.

What is claimed is:

1. A method for card authentication, said method comprising:
    receiving, at a card reader:
        a card with a graphical representation; and
        a plurality of transaction details;
    processing the graphical representation of the card within a graphical representation processing module included in the card reader;
    identifying, at the graphical representation processing module, a plurality of colors included in the graphical representation;
    determining, at the graphical representation processing module, from the plurality of colors, a representative number, said determining based on a dynamic color-to-numeral mapping, wherein each color, included in the dynamic color-to-numeral mapping, represents a numeral;
    transmitting the representative number and the plurality of transaction details to a decryption controller module within the card reader;
    identifying, a random number control digit within the representative number, at the decryption controller module;
    identifying, an information order control digit within the representative number, at the decryption controller module;
    based on the identified random number control digit, removing, at the decryption controller module, one or more random numbers included in the representative number;
    based on the identified information order control digit, deciphering, at the decryption controller module, card data, said card data comprising:
        a user identification number;
        a last transaction amount;
        a second to last transaction amount;
        a last transaction device identifier; and
        a second to last transaction device identifier;
    transmitting, from a verification controller module included in the card reader, the card data and the plurality of transaction details to a card issuer;
    receiving a response from the card issuer; and
    displaying the received response at the card reader.

2. The method of claim 1, wherein the card reader is a point-of-sale device.

3. The method of claim 1, wherein the card reader is an automated teller machine.

4. The method of claim 1, wherein the information order control digit identifies an order in which the user identification number, the last transaction amount, the second to last transaction amount, the last transaction device identifier and the second to last transaction device identifier are presented within the representative number.

5. The method of claim 1, wherein the random number control digit identifies one or more positions of the placement of random numbers within the representative number.

6. The method of claim 1, wherein a display surface of the card is comprised, at least in part, of electronic ink.

7. The method of claim 1, wherein a display surface of the card is comprised, at least in part, of an organic light emitting diode ("OLED") surface.

8. The method of claim 1, wherein each color, included in the dynamic color-to-numeral mapping, represents a unique numeral.

9. A method for card authentication, said method comprising:
    receiving, at a card reader:
        a card with a graphical representation; and
        a plurality of transaction details;
    transmitting the graphical representation from the card reader to a web service via a URL hosted module;
    processing the graphical representation of the card at the web service, said processing comprising:
        identifying, from the graphical representation, a plurality of colors included in the graphical representation;
        determining, from the plurality of colors, a representative number, said determining based on a dynamic color-to-numeral mapping, wherein each color, included in the dynamic color-to-numeral mapping, represents a numeral;
        transmitting the representative number and the plurality of transaction details to a decryption controller module;
        identifying, an information order control digit within the representative number, at the decryption controller module;
        identifying, a random number control digit within the representative number, at the decryption controller module;

based on the identified random number control digit, removing, at the decryption controller module, one or more random numbers included in the representative number;

based on the identified information number control digit, deciphering, at the decryption controller module, card data, said card data comprising:
 a user identification number;
 a last transaction amount;
 a second to last transaction amount;
 a last transaction device identifier; and
 a second to last transaction device identifier;

transmitting the card data, from the web service to the card reader, via the URL hosted module;

transmitting, from a verification controller module included in the card reader, the card data and the plurality of transaction details to a card issuer;

receiving a response from the card issuer; and displaying the received response at the card reader.

10. The method of claim 9, wherein the card reader is a point-of-sale device.

11. The method of claim 9, wherein the card reader is an automated teller machine.

12. The method of claim 9, wherein the information order control digit identifies an order in which the user identification number, the last transaction amount, the second to last transaction amount, the last transaction device identifier and the second to last transaction device identifier are presented within the representative number.

13. The method of claim 9, wherein the random number control digit identifies one or more positions of the placement of random numbers within the representative number.

14. The method of claim 9, wherein a display surface of the card is comprised, at least in part, of electronic ink.

15. The method of claim 9, wherein a display surface of the card is comprised, at least in part, of an organic light emitting diode ("OLED") surface.

16. An automated teller machine comprising:
 a card reader, said card reader operable to receive insertion of a card comprising a graphical representation;
 a graphics controller, said graphics controller operable to:
  select a random color for each numeral included in a plurality of numerals, the selection identifying a color-to-numeral interpretation;
  translate the graphical representation into numerical data based on the color-to-numeral interpretation;
  transmit the numerical data;
  receive updated numerical data;
  translate the updated numerical data into an updated graphical representation; and
  push the updated graphical representation to the card;
 a front controller, said front controller operable to:
  receive the numerical data;
  generate refreshed transaction data upon completion of a transaction;
  generate an updated information order control digit;
  generate an updated random number control digit; and
  maintain the color-to-numeral interpretation received from the graphics controller;
 a random number generator, said random number generator operable to:
  periodically generate a random number, said random number to be used by the front controller to generate the updated random number control digit; and
  transmit the generated random number to the front controller;
 a computation node, said computation node operable to:
  receive the refreshed transaction data, the updated information order control digit and the updated random number control digit from the front controller;
  determine an updated numerical data based on the refreshed transaction data, the updated information order control digit, the updated random number control digit and the numerical data; and
  transmit the updated numerical data to the graphics controller;
 a decryption controller, said decryption controller operable to:
  receive the graphical representation from the graphics controller;
  receive the color-to-numeral interpretation from the front controller;
  identify the numerical data based on the graphical representation and the color-to-numeral interpretation;
  identify a random number control digit within the numerical data;
  identify the information order control digit within the numerical data;
  remove one or more random numbers from the numerical data, said one or more random numbers being located in locations within the numerical data, said locations controlled by the random number control digit;
  decipher, from the numerical data, card data comprising:
   a user identification number;
   a last transaction amount;
   a second to last transaction amount;
   a last transaction device identifier; and
   a second to last transaction device identifier; and
  transmit the card data and a set of transaction data;
 a verification controller, said verification controller operable to:
  receive the card data and the set of transaction data;
  transmit the card data and the set of transaction data to an issuer; and
  receive an approval or denial response from the issuer.

17. The automated teller machine of claim 16, wherein the random number generator is further operable to generate one or more random numbers to be placed in locations within the numerical data, said locations controlled by the random number control digit.

* * * * *